US012631251B2

(12) United States Patent
      Ito

(10) Patent No.: US 12,631,251 B2
(45) Date of Patent: May 19, 2026

(54) DIFFERENTIAL DEVICE AND DRIVE TRANSMISSION DEVICE

(71) Applicant: AISIN CORPORATION, Kariya (JP)

(72) Inventor: Kohei Ito, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 19/206,658

(22) Filed: May 13, 2025

(65) Prior Publication Data

US 2026/0009466 A1 Jan. 8, 2026

(30) Foreign Application Priority Data

Jul. 5, 2024 (JP) ................................. 2024-108883

(51) Int. Cl.
    *F16H 57/04* (2010.01)
    *F16H 48/40* (2012.01)
    *F16H 57/021* (2012.01)
    *F16H 57/037* (2012.01)
    *F16H 57/02* (2012.01)

(52) U.S. Cl.
    CPC ......... *F16H 57/0483* (2013.01); *F16H 48/40* (2013.01); *F16H 57/021* (2013.01); *F16H 57/037* (2013.01); *F16H 57/043* (2013.01); *F16H 2057/02052* (2013.01)

(58) Field of Classification Search
    CPC ... F16H 57/0483; F16H 48/40; F16H 57/0421
    See application file for complete search history.

(56) References Cited

U.S. PATENT DOCUMENTS

| 5,643,127 | A | * | 7/1997 | Yoshii | ................. | F16H 57/0483 |
| | | | | | | 184/6.12 |
| 7,452,300 | B2 | * | 11/2008 | Kohno | ................ | F16H 57/0483 |
| | | | | | | 475/160 |
| 8,187,136 | B2 | * | 5/2012 | Fujita | ...................... | F16H 48/08 |
| | | | | | | 74/606 R |
| 10,663,055 | B2 | * | 5/2020 | Nakamura | .......... | F16H 57/0427 |

(Continued)

FOREIGN PATENT DOCUMENTS

| CN | 106555869 A | * | 4/2017 | ............. | F16H 48/40 |
| DE | 102009036986 A1 | * | 2/2011 | ............. | F16H 48/08 |

(Continued)

OTHER PUBLICATIONS

Dec. 8, 2025 Extended European Search Report issued in European Patent Application No. 25182294.6.

*Primary Examiner* — Sherry L Estremsky
(74) *Attorney, Agent, or Firm* — Oliff PLC

(57) ABSTRACT

A differential device includes a differential gear mechanism including a target shaft hole through which a target shaft penetrates. An oil reception groove is formed at a position that is on an inner circumferential surface of the target shaft hole and that communicates with a target opening of an end portion on an axial outer side in the target shaft hole. The oil reception groove extends in the circumferential direction. A connection groove extending in an axial direction is formed on at least one of the inner circumferential surface of the target shaft hole and an outer circumferential surface of the target shaft in such a way as to connect the oil reception groove and an accommodation chamber of the differential case to each other.

5 Claims, 3 Drawing Sheets

(56) References Cited

U.S. PATENT DOCUMENTS

| | | | |
|---|---|---|---|
| 11,988,275 B2 * | 5/2024 | Steiner | F16H 48/08 |
| 2008/0026900 A1 * | 1/2008 | Gotoh | F16H 48/05 |
| | | | 192/48.1 |
| 2024/0102548 A1 * | 3/2024 | Oyaizu | F16H 57/0423 |

FOREIGN PATENT DOCUMENTS

| | | | |
|---|---|---|---|
| JP | H0635726 U | * | 5/1994 |
| JP | 2009-168070 A | | 7/2009 |
| JP | 2019132333 A | * | 8/2019 |
| SE | 388 020 B | | 9/1976 |

* cited by examiner

DIFFERENTIAL DEVICE AND DRIVE TRANSMISSION DEVICE

CROSS REFERENCE TO RELATED APPLICATIONS

This application is based on and claims priority under 35 U.S.C. § 119 to Japanese Patent Application 2024-108883, filed on Jul. 5, 2024, the entire content of which is incorporated herein by reference.

TECHNICAL FIELD

This disclosure generally relates to a differential device and a drive transmission device including the differential device.

BACKGROUND DISCUSSION

A differential device including a differential case and a gear mechanism accommodated in the differential case requires oil for lubrication of the gear mechanism to be introduced into the differential case. A differential device (1) disclosed in JP2009-168070A (Reference 1) includes a boss portion (25, 27) that protrudes outward in an axial direction of a differential case (3) and on which a notch is formed (in the BACKGROUND DISCUSSION, the reference signs in the parentheses indicate elements in Reference 1). The notch serves as an introduction portion (29) for introducing oil from an outside of the differential case (3) into the differential case (3). The introduction portion (29) includes a surface formed to be inclined forward in a rotational direction of the differential case (3), and thus facilitate introduction of the oil agitated by rotation of the differential case (3). In the differential case (3), an introduction guide portion (31) is provided for guiding, to a guide portion (23), the oil introduced from the introduction portion (29). The guide portion (23) is provided for guiding the oil to a lubrication-target gear mechanism. The introduction guide portion (31) is formed to have a diameter larger than an inner diameter of the tubular boss portion (25, 27). Thus, the oil introduced from the introduction portion (29) easily flows to the guide portion (23) by centrifugal force of the rotating differential case (3).

Introducing the oil from the introduction portion is effective in a low rotational speed range in which a rotational speed of the differential case is low. However, when a rotational speed of the differential case becomes high, the centrifugal force causes the oil to fly to a radial-direction outer side of the boss portion, and thus, the oil is not easily introduced from the introduction portion. The introduction guide portion is configured to easily guide the oil to the lubrication target when the centrifugal force becomes large. However, when an amount of the oil introduced from the introduction portion becomes small, an amount of the oil reaching the introduction guide portion also becomes small, and thus, there is a possibility that an amount of the oil guided to the lubrication target also becomes small.

A need thus exists for a differential device and a drive transmission device, which are not susceptible to the drawback mentioned above.

SUMMARY

A differential device in view of the above includes a differential gear mechanism and a differential case. The differential gear mechanism includes a plurality of gears meshing with each other. The differential case includes an accommodation chamber accommodating the differential gear mechanism, and rotates around a predetermined reference axis. A direction along the reference axis is defined as an axial direction, a direction perpendicular to the reference axis is defined as a radial direction, a direction circling around the reference axis is defined as a circumferential direction, and a side from a center of the accommodation chamber to an outside of the differential case in the axial direction is defined as an axial outer side. The differential gear mechanism is configured in such a way as to distribute, to a pair of output shafts arranged on the reference axis, drive force transmitted to the differential case. The differential case includes a pair of output shaft holes through which a pair of the output shafts penetrate. One of a pair of the output shafts is defined as a target shaft. One of a pair of the output shaft holes is defined as a target shaft hole through which the target shaft penetrates. An opening of an end portion on the axial outer side in the target shaft hole is defined as a target opening. An oil reception groove is formed at a position that is on an inner circumferential surface of the target shaft hole and that communicates with the target opening. The oil reception groove is recessed to an outer side in the radial direction, and extends in the circumferential direction. A connection groove extending in the axial direction is formed on at least one of the inner circumferential surface of the target shaft hole and an outer circumferential surface of the target shaft in such a way as to connect the oil reception groove and the accommodation chamber to each other.

According to this configuration, oil existing around the differential case enters the oil reception groove from the target opening, and is guided from the oil reception groove into the accommodation chamber through the connection groove. Thus, the oil can be guided from an outside of the differential case to an inside of the accommodation chamber, and can appropriately lubricate the differential gear mechanism. The oil reception groove is formed on the inner circumferential surface of the target shaft hole in such a way as to be recessed to an outer side in the radial direction. For this reason, even in a situation where the differential case and the target shaft rotate and the centrifugal force acts on oil adhering to the differential case and the target shaft, the oil can be received from an outer side in the radial direction by the oil reception groove, and can be appropriately guided into the accommodation chamber. Thus, according to this configuration, even when the centrifugal force acts on the lubricating oil to be introduced into the differential case, the oil can be appropriately introduced into the differential case.

Additional features and advantages of the differential device become apparent from the following description that is made on an exemplary and non-limiting embodiment with reference to the drawings.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
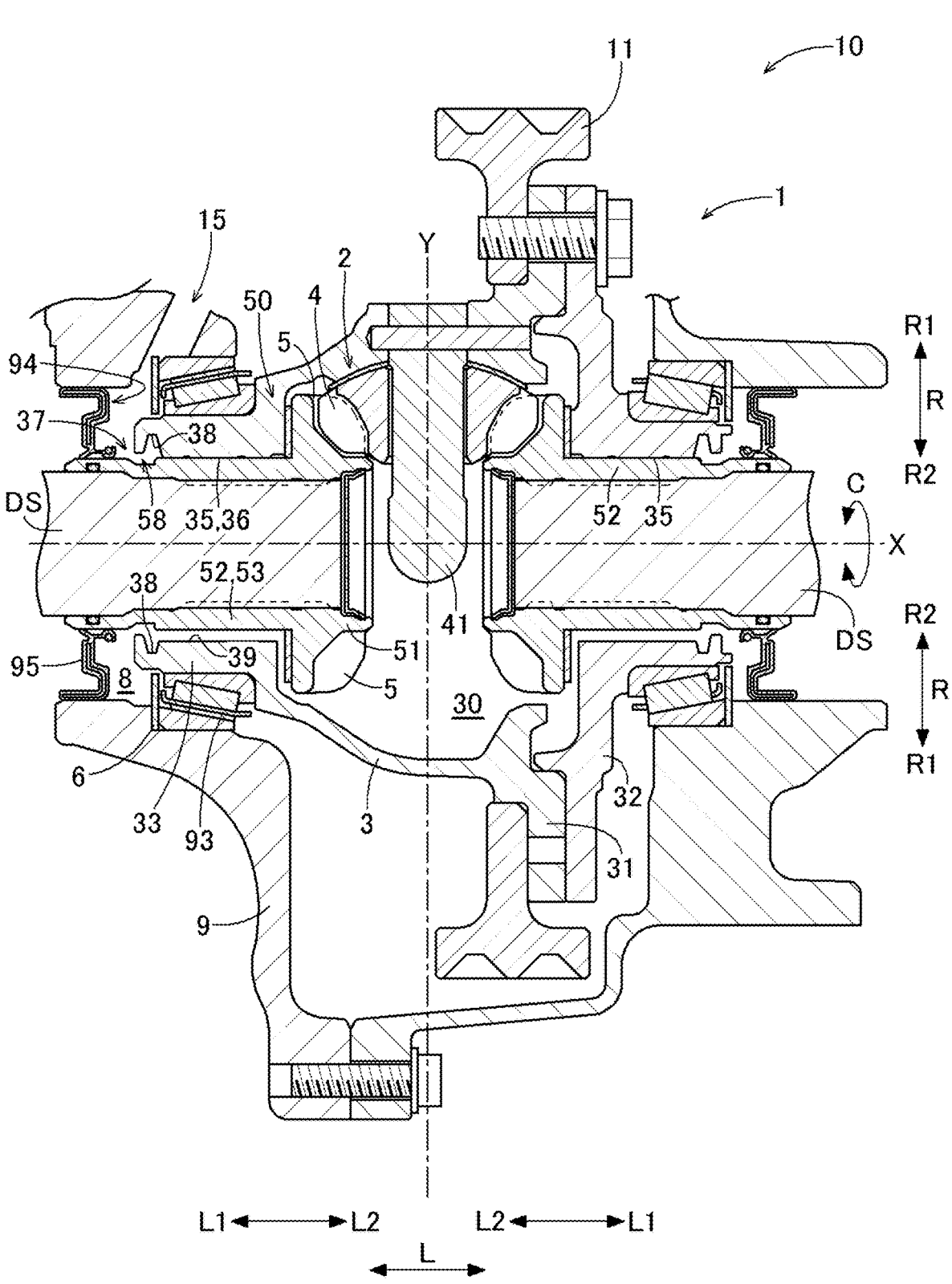
FIG. 1 is an axial sectional view of a differential device.

The following describes an embodiment of a differential device, referring to the drawings and taking, as an example, the differential device included in a drive transmission device. The differential device described as the example in this embodiment is included in the drive transmission device for driving wheels of a vehicle, and is coupled to the wheels to drive the wheels.

As illustrated in FIG. 1, the differential device 1 includes a differential gear mechanism 2 that distributes, to output shafts 52, power transmitted to a differential input gear 11 from an unillustrated drive force source such as a rotating electric machine (a traction motor or a motor-generator) or an internal combustion engine, none of which is illustrated. The output shafts 52 are coupled to a pair of the wheels (not illustrated) to drive the wheels. The differential gear mechanism 2 includes a plurality of gears that mesh with each other. The differential gear mechanism 2 exemplified in this embodiment is constituted by a bevel gear mechanism. The differential gear mechanism 2 includes a plurality of pinion gears 4 and a pair of side gears 5 that mesh with a plurality of the pinion gears 4. At least a pair of the pinion gears 4 are provided. The pinion gear 4 is supported by a pinion shaft 41 in such a way as to be rotatable relative to the pinion shaft 41 supported by a differential case 3. The differential input gear 11 is coupled to the differential case 3. The differential case 3 and the differential input gear 11 rotate integrally with each other around the reference axis X that is the rotational axis of the differential case 3. The pinion shaft 41 rotates integrally with the differential case 3. The pinion gear 4 supported by the pinion shaft 41 rotates around the pinion shaft 41, and revolves around the reference axis X. The side gear 5 meshing with the pinion gears 4 rotates in conjunction with the rotation of the differential input gear 11 and the differential case 3.

The differential device 1 exemplified in this embodiment is thus constituted by the bevel gear mechanism. However, the differential device 1 is not limited to this configuration, and may be a planetary gear mechanism.

As illustrated in FIG. 1, the differential case 3 includes an accommodation chamber 30 that accommodates the differential gear mechanism 2. The differential case 3 rotates around the reference axis X. A direction along the reference axis X is defined as an axial direction L, a direction perpendicular to the reference axis X is defined as a radial direction R, and a direction circling around the reference axis X is defined as a circumferential direction C. In the axial direction L, a direction from the center (an accommodation-chamber center line Y) of the accommodation chamber 30 toward an outside of the differential case 3 is referred to as an axial outer side L1, and a direction from an outside of the differential case 3 toward the accommodation-chamber center line Y is referred to as an axial inner side L2. The axis of the pinion shaft 41 (the rotational axis of the pinion gear 4) is positioned on the accommodation-chamber center line Y. In the radial direction R, a direction toward a side (outside) distant from the reference axis X is referred to as a radial outer side R1, and a direction toward the reference axis X is referred to as a radial inner side R2. In a state where the differential device 1 is mounted on the vehicle, a direction along the vertical direction is referred to as an up-down direction V, and an upper side in the up-down direction V is referred to as an upper side V1, and a lower side in the up-down direction V is referred to as a lower side V2 (refer to FIG. 3).

The drive transmission device 10 includes the differential device 1 and a housing 9 that accommodates the differential device 1. The drive transmission device 10 may include a gear mechanism (such as a reduction mechanism whose examples include a counter gear mechanism and a planetary gear mechanism) and a rotating electric machine (traction motor) which are not illustrated. The gear mechanism transmits the power to the differential input gear 11 of the differential device 1. The rotating electric machine serves as the drive force source. As illustrated in FIG. 1 and the like, the housing 9 supports the differential case 3. A part of the output shaft 52 protrudes to an axial outer side L1 from the housing 9, and it can be said that the housing 9 even in such a configuration accommodates the differential device 1 and the differential case 3. The differential case 3 is freely rotatably supported by the housing 9 via the support bearings 93.

In this embodiment, the side gear 5 and the output shaft 52 are formed integrally with each other as a side gear member 50. Specifically, the side gear member 50 includes a side gear forming portion 51 on which the side gear 5 is formed, and the hollow tubular output shaft 52 protruding from the side gear forming portion 51 to an axial outer side L1. The side gear 5 and the output shaft 52 rotate integrally with each other. The differential gear mechanism 2 distributes, to a pair of the output shafts 52 arranged on the reference axis X, the drive force transmitted to the differential case 3 via the differential input gear 11. A drive shaft DS, a coupling shaft, and the like that are coupled to the unillustrated wheel is coupled to each of the output shafts 52 on the radial inner side R2 of the output shaft 52 so that the power from the drive force source distributed by the differential device 1 is transmitted to the wheels.

Figure 2:
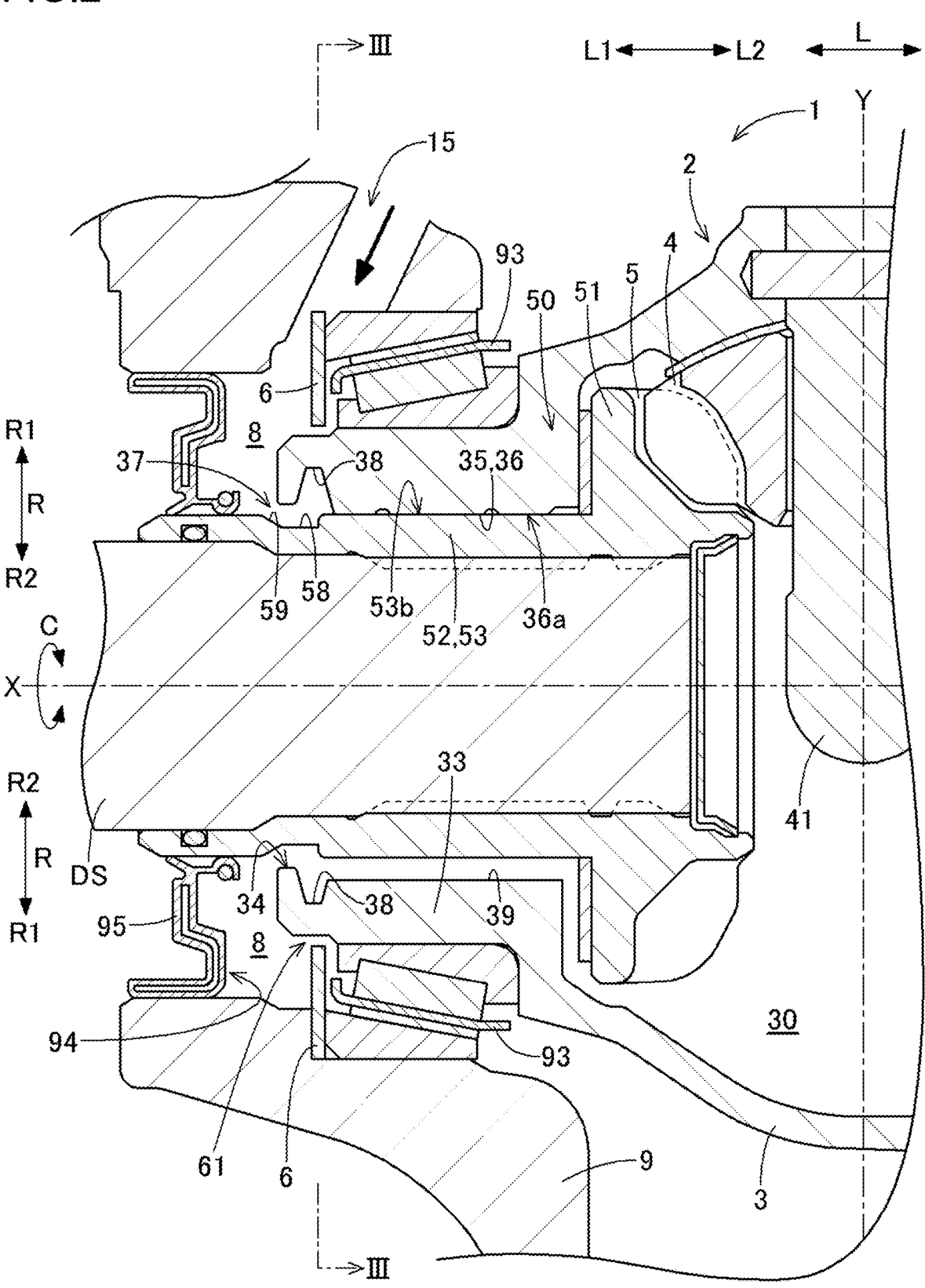
FIG. 2 is an enlarged axial sectional view of the differential device.

In this embodiment, the differential case 3 is configured to include a first case 31 and a second case 32. The first case 31 is a case body forming the accommodation chamber 30, and is open on one side in the axial direction L. The second case 32 is a cover member that closes an open portion of the first case 31 from the other side in the axial direction L. The differential case 3 freely rotatably supports the side gear member 50. In other words, the differential case 3 freely rotatably supports the output shafts 52 each of which is a tubular protrusion portion of the side gear member 50. The differential case 3 includes a pair of output shaft holes 35 through which a pair of the output shafts 52 penetrate. As illustrated in FIG. 1 and FIG. 2, the differential case 3 includes a pair of tubular boss portions 33 that are arranged on the reference axis X and each protrude to an axial outer side L1. A pair of the output shaft holes 35 are formed in such a way as to penetrate through a pair of the boss portions 33. The output shaft 52 and the output shaft hole 35 are arranged in such a way that an outer circumferential surface on the radial outer side R1 in the output shaft 52 faces an inner circumferential surface on a radial inner side R2 in the output shaft hole 35.

Naturally, the differential case 3 may be formed in such a way as not to include the boss portion 33 as in this embodiment, and the output shaft hole 35 may be formed in such a way as to penetrate a wall that is included in the differential case 3 and that does not protrude to an axial outer side L1 of the differential case 3. The differential case 3 may be constituted by three or more members. For example, the differential case 3 may be constituted by a case body that forms the accommodation chamber 30 and is open on both sides in the axial direction L, and two cover members that close respective open portions of the case body from both sides in the axial direction L.

In this embodiment, the differential case 3 does not include an opening communicating with an outside of the differential case 3, other than a pair of the output shaft holes 35. In other words, an outside of the differential case 3 and the accommodation chamber 30 communicate with each other only through the output shaft holes 35, except through gaps such as a gap between the pinion shaft 41 and the differential case 3, a gap at a joint portion between the first case 31 and the second case 32, and a gap at a meshing portion between the pinion gear 4 and the side gear 5. In other words, the differential device 1 according to this embodiment is a differential device including the closed type differential case 3 that does not include a window (opening) for flowing of oil. For this reason, the differential device 1 according to this embodiment includes an oil reception groove 38 and a connection groove 39 as described below.

However, even an open-type differential device 1 in which a window for flowing of oil is formed in the differential case 3 may include a configuration of this embodiment including the oil reception groove 38, the connection groove 39, and the like. Thereby, the oil can be appropriately introduced into the accommodation chamber 30 even when an outside of the differential case 3 is not filled with oil. Thus, even in the open-type differential 1, an amount of oil required inside the housing 9 of the drive transmission device 10 can be suppressed to a small level.

Herein, at least one of a pair of the output shafts 52 is defined as the target shaft 53, and one or each of a pair of the output shaft holes 35 is defined as the target shaft hole 36 through which the target shaft 53 penetrates. An opening of an end portion on an axial outer side L1 in the target shaft hole 36 is defined as a target opening 37. For simplification in FIG. 1 and the like, only the target shaft 53 and the like on a left side in the drawings are denoted by the reference signs. However, in this embodiment, both of a pair of the output shafts 52 are the target shafts 53, and both of a pair of the output shaft holes 35 are the target shaft holes 36. Naturally, only one of a pair of the output shafts 52 may be the target shaft 53, and one of a pair of the output shaft holes 35 may be the target shaft hole 36 through which the target shaft 53 penetrates.

Figure 3:
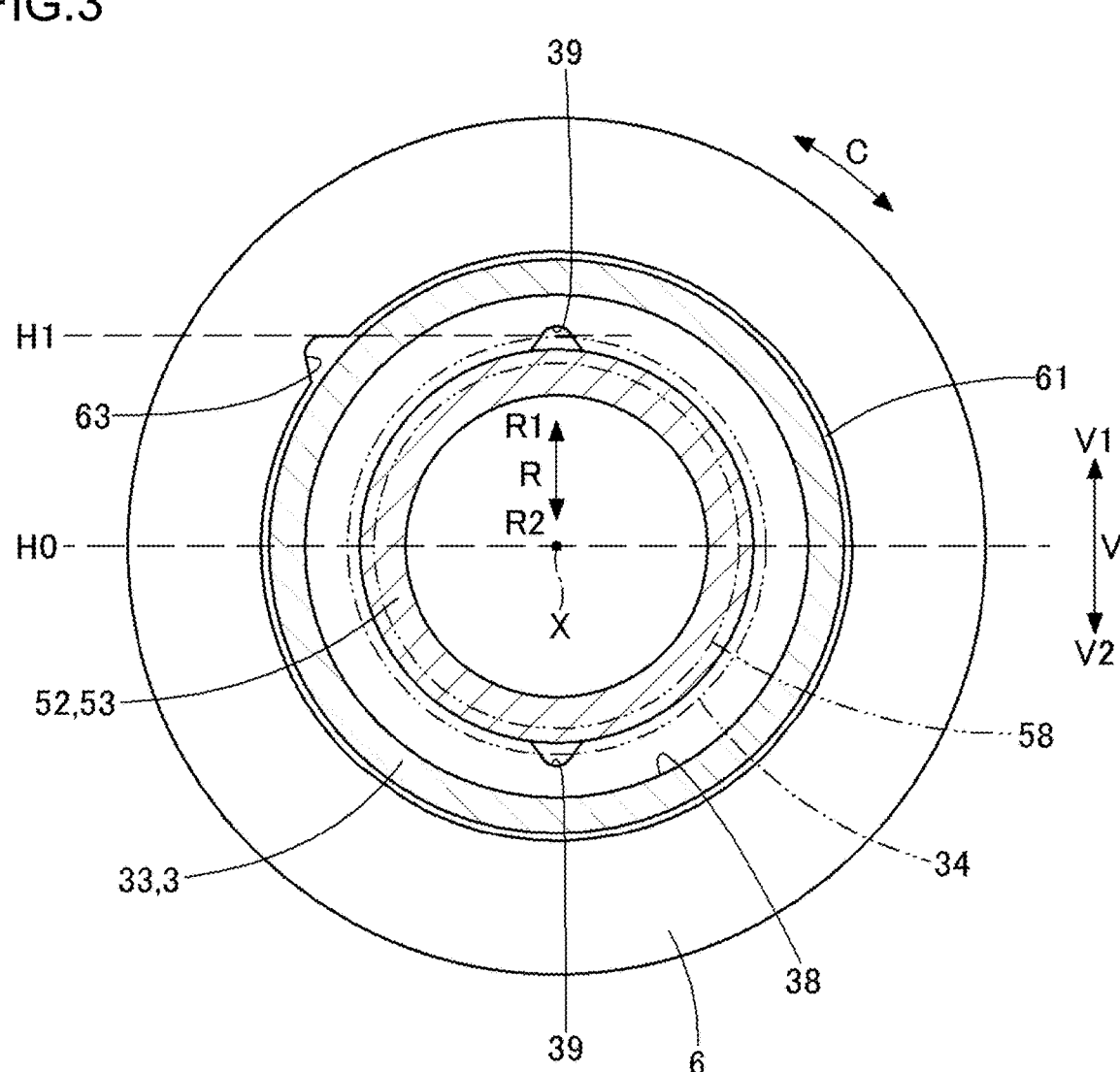
FIG. 3 is a perpendicular-to-axis sectional view of the differential device.

Although a specific oil flow line is described below, the oil reception groove 38 is formed at a position that is on an inner circumferential surface 36a of the target shaft hole 36 and that communicates with the target opening 37, as illustrated in FIG. 2 and FIG. 3. The oil reception groove 38 is recessed to a radial outer side R1, and extends in the circumferential direction C. According to a configuration exemplified in this embodiment, the oil reception groove 38 is formed in such a way as to extend parallel to the circumferential direction C. According to a configuration exemplified in this embodiment, the oil reception groove 38 is formed in such a way as to extend continuously over an entire area in the circumferential direction C. However, the oil reception groove 38 may be formed in such a way to extend in a direction inclined from a direction parallel to the circumferential direction C. For example, the oil reception groove 38 may be formed in a helical shape on the inner circumferential surface 36a of the target shaft hole 36. The oil reception groove 38 may be intermittently formed along the circumferential direction C, or may be formed in such a way as to continuously extend in a partial area in the circumferential direction C.

In this embodiment, the connection groove 39 extending in the axial direction L is formed on the inner circumferential surface 36a of the target shaft hole 36 in such a way as to connect the oil reception groove 38 and the accommodation chamber 30 to each other. The connection groove 39 is formed parallel to the axial direction L. Thereby, the oil that has entered the oil reception groove 38 can be guided from the oil reception groove 38 into the accommodation chamber 30 through the connection groove 39.

The connection groove 39 may be formed on the outer circumferential surface 53b of the target shaft 53, or may be formed on the inner circumferential surface 36a of the target shaft hole 36 and the outer circumferential surface 53b of the target shaft 53. In other words, the connection groove 39 may be formed on at least one of the inner circumferential surface 36a of the target shaft hole 36 and the outer circumferential surface 53b of the target shaft 53 in such a way as to extend in the axial direction L and connect the oil reception groove 38 and the accommodation chamber 30 to each other. In each of these cases, the connection groove 39 does not need to be parallel to the axial direction L, and may be inclined in such a way as to extend in the circumferential direction C as the connection groove 39 extends in the axial direction L.

In this embodiment, the two connection grooves 39 are arranged at positions between which the reference axis X is sandwiched and of which phases differ from each other by 180 degrees, as illustrated in FIG. 3. Preferably, the connection grooves 39 are each arranged at a phase that differs from a position (i.e., a phase at which the pinion gear 4 is arranged) at which a coupling portion included in the pinion shaft 41 and coupled to the differential case 3 is arranged. When reaction force caused by the meshing between the pinion gear 4 and the side gear 5 is transmitted to the differential case 3 via the pinion shaft 41, the reaction force can be prevented from acting on the connection grooves 39.

In the case of the closed type differential case 3 as in this embodiment, the oil that has been introduced into the accommodation chamber 30 is not easily discharged from the accommodation chamber 30. Particularly, in a state where the differential case 3 is rotating, the centrifugal force causes the oil to fly toward an inner wall of the differential case 3 while the oil continues to be supplied into the accommodation chamber 30 through the connection grooves 39. For this reason, there is a possibility of an increase of impurities that are included in the oil in the accommodation chamber 30 and whose examples include metal powder generated by friction of the gears. However, when the differential case 3 stops, the oil can be discharged from the accommodation chamber 30 to an outside of the differential case 3 through the connection groove 39. As illustrated in FIG. 3, when at least one connection groove 39 is positioned on the lowest side V2 in the up-down direction V in a state (vehicle-mounted state) where the differential device 1 is mounted on the vehicle, the oil in the accommodation chamber 30 can continue to be discharged until an oil surface reaches a height at which the connection groove 39 is positioned. Thereby, at least approximately ½ to ⅔ of the maximum amount of the oil in the accommodation chamber 30 can be replaced.

In this embodiment, an introduction groove 58 is formed on the outer circumferential surface 53b of the target shaft 53. The introduction groove 58 is recessed to a radial inner side R2, and extends in the circumferential direction C. The introduction groove 58 is provided at a position overlapping with the target opening 37 when viewed in a radial direction. Specifically, the introduction groove 58 is provided at a position overlapping with an opening end portion 34 when viewed in the radial direction. The opening end portion 34 is an end portion on a radial inner side R2 in the target opening 37, and is an end portion on an axial outer side L1 in the target opening 37. According to a configuration exemplified in this embodiment, the introduction groove 58 is formed at a position overlapping with both the target opening 37 (opening end portion 34) and the oil reception groove 38 when viewed in the radial direction. However, the introduction groove 58 may overlap with at least the target opening 37 (opening end portion 34) when viewed in the radial direction, and does not need to overlap with the oil reception groove 38. The term "A overlaps with B" refers to a state of "at least a part of A overlaps with at least a part of B".

Introducing the oil into the introduction groove 58 from an axial outer side L1 of the opening end portion 34 can cause an oil flow to an axial inner side L2 of the opening end portion 34. As a result, the oil is easily introduced also into the oil reception groove 38 located on an axial inner side L2 of the target opening 37 (opening end portion 34). When the oil reception groove 38 and the introduction groove 58 overlap with each other in the radial direction, an oil flow line from the introduction groove 58 to the oil reception groove 38 is easily secured. However, even when the oil reception groove 38 and the introduction groove 58 do not overlap with each other in the radial direction, an oil flow to an axial inner side L2 is promoted so that the oil is easily introduced into the oil reception groove 38. When the introduction groove 58 is thus formed, the oil is supplied into the accommodation chamber 30 through the introduction groove 58, the oil reception groove 38, and the connection groove 39. In this embodiment, as illustrated in FIG. 2 and FIG. 3, the opening end portion 34 is arranged on a radial inner side R2 of a bottom portion (an end portion on a radial outer side R1) of the connection groove 39. For this reason, the oil that has been introduced into the oil reception groove 38 is easily guided into the connection groove 39. When the connection groove 39 is formed on a side of the target shaft 53, the introduction groove 58 and the connection groove 39 may be connected to each other so that the oil is supplied from the introduction groove 58 into the accommodation chamber 30 through the connection groove 39 without passing through the oil reception groove 38.

In this embodiment, the side wall 59 on an axial outer side L1 in the introduction groove 58 is an inclined surface that is inclined in such a way as to extend to a radial inner side R2 as the inclined surface extends to an axial inner side L2. Thus, the oil on the outer circumferential surface 53b of the target shaft 53 is easily guided from an axial outer side L1 to an axial inner side L2. In other words, the oil on an axial outer side L1 of the introduction groove 58 is easily guided into the introduction groove 58. Naturally, the introduction groove 58 may be formed by a non-inclined surface along the radial direction R without including such an inclined surface. Not only the side wall on an axial outer side L1 but also a side wall on an axial inner side L2 in the introduction groove 58 may be formed as inclined surfaces.

Incidentally, as described above, the differential case 3 is rotatably supported by the housing 9 via the support bearings 93. As illustrated in FIG. 1 and FIG. 2, the support bearing 93 is arranged in such a way as to support, from a radial outer side R1, the tubular boss portion 33 that protrudes to an axial outer side L1 in the differential case 3. The housing 9 also includes a facing portion 94 through which the target shaft 53 penetrates and that faces the support bearing 93 from an axial outer side L1, on a radial outer side R1 of the target shaft 53. According to a configuration exemplified in this embodiment, the facing portion 94 is configured to include an oil seal 95. In a broad sense, the oil seal 95 is also included in the housing 9.

In this embodiment, a partition member 6 is arranged at a position adjacent to the support bearing 93 from an axial outer side L in such a way as to cover a surface on an axial outer side L1 in the support bearing 93. A storage space 8 temporarily storing the oil is formed in a space surrounded by the facing portion 94 (oil seal 95), an inner wall included in the housing 9 but excluding the facing portion 94, the outer circumferential surface 53b of the target shaft 53 (output shaft 52), and the partition member 6. This storage space 8 functions as a catch tank that temporarily stores the oil supplied from an oil introduction path 15. In this embodiment, a shim arranged between an outer race of the support bearing 93 and the housing 9 in the axial direction L is used as the partition member 6.

A gap 61 is formed between the partition member 6 and the differential case 3. A part of the oil stored in the storage space 8 flows over the partition member 6 to pass through the gap 61 and lubricate the support bearing 93. As illustrated in FIG. 3, preferably, the partition member 6 includes a communication hole 63. In the state (vehicle-mounted state) where the drive transmission device 10 is mounted on the vehicle, the communication hole 63 is provided on an upper side V1 of the reference axis X (on an upper side V1 of a reference height H0 corresponding to the reference axis X), and allows the oil to flow in the axial direction L. Thereby, the communication hole 63 allows the oil to be appropriately supplied to the support bearing 93.

When the gap 61 is small, there is a possibility that the oil flows out from the communication hole 63, and an oil surface level in the storage space 8 reaches a height depending on a position of the communication hole 63. In this embodiment, the two connection grooves 39 are arranged at positions between which the reference axis X is sandwiched and of which phases differ from each other by 180 degrees. The connection groove 39 on the lowest side V2 becomes positioned on the highest side V1 when a pair of the connection grooves 39 are positioned at the reference height H0. For this reason, providing the communication hole 63 on an upper side V1 of the reference height H0 enables at least one of the two connection grooves 39 to be positioned on a lower side V2 of an oil surface level in the storage space 8 in any state including the state where both of the two connection grooves 39 are arranged at the reference height H0. Thereby, the oil in the storage space 8 can be appropriately introduced into the accommodation chamber 30 via at least one of the two connection grooves 39.

Although the communication hole 63 may be provided on an upper side V1 of the reference height H0, the communication hole 63 is preferably provided at a position (arrangement height H1) corresponding to the connection groove 39 in a state where this connection groove 39 is positioned on the uppermost side V1 in the up-down direction V. Thus, the oil can appropriately flow through the connection groove 39 and the communication hole 63. From another standpoint, the communication hole 63 may be provided at a height corresponding to the outer circumferential surface 53b on the uppermost side V1 in the target shaft 53 in the vehicle-mounted state.

The following describes an oil flow into the accommodation chamber 30. First, the description is made on a case where the differential case 3 is not rotating so that no centrifugal force acts on the oil, or a case where the differential case 3 is rotating at a relatively low speed even when rotating, so that the centrifugal force acting on the oil is relatively small. The oil scooped up by a rotating member such as the differential input gear 11 and the oil supplied from an unillustrated oil pump (e.g., an electric oil pump) is introduced from the oil introduction path 15 into the storage space 8 as indicated by the arrow in FIG. 2, and fills the storage space 8. The oil is guided into the accommodation chamber 30 by flowing through the introduction groove 58, the oil reception groove 38, and the connection groove 39, or by flowing over the opening end portion 34 and through the oil reception groove 38 and the connection groove 39. As described above, the oil may be guided into the accommodation chamber 30 through the connection groove 39 without flowing through the oil reception groove 38.

Next, the description is made on a case where the differential case 3 rotates at a relatively high speed so that the centrifugal force acting on the oil is relatively large. The oil introduced from the oil introduction path 15 is easily scattered to a radial outer side R1 by the centrifugal force caused by the rotation of the output shaft 52 (target shaft 53) and acting on the oil. The oil reception groove 38 is arranged in the scattered direction, i.e., on a radial outer side R1, and the oil scattered to a radial outer side R1 is received by the oil reception groove 38. Then, the oil is guided into the accommodation chamber 30 through the oil reception groove 38 and the connection groove 39. In the configuration of this embodiment, the introduction groove 58 is also provided, and the oil introduced from the oil introduction path 15 is easily guided into the introduction groove 58 on the outer circumferential surface 53*b* of the output shaft 52 (target shaft 53). The oil reception groove 38 is positioned on a radial outer side R1 of the introduction groove 58. Thus, the oil reception groove 38 can appropriately receive the oil scattered to a radial outer side R1 from the target shaft 53 by the centrifugal force so that the oil can be supplied into the accommodation chamber 30 via the connection groove 39.

Thus, according to this embodiment, even when the differential device 1 is of a closed type, the oil can be appropriately supplied into the differential case 3 (the accommodation chamber 30) regardless of a rotational speed of the differential case 3. The closed type differential case 3 does not includes a window (opening). Thereby, the differential case 3 can have a higher rigidity, and can be easily configured to be compact. Further, since the closed type differential case 3 does not include an opening that reduces the rigidity, an entire rigidity balance of the differential case 3 can be easily made uniform. Thereby, an energy loss can be reduced, and energy efficiency (a fuel consumption rate in the case of the drive force source including the internal combustion engine, or an electric power consumption rate in the case of the drive force source including the rotating electric machine) can be easily improved. Furthermore, it is easier to prevent occurrence of: distortion of the differential case 3 due to stress acting on the differential case 3 and caused by meshing between the differential input gear 11 and a gear meshing with the differential input gear 11 or due to stress acting on the differential case 3 and caused by meshing between the pinion gear 4 and the side gear 5; loosening of a fastening member such a bolt fastening the first case 31 and the second case 32 to each other; and loosening of a fastening member such as a bolt fastening the differential case 3 and the differential input gear 11 to each other. In addition, a cross-sectional shape of the cylindrical output shaft hole 35 can be prevented from being distorted by stress on the differential case 3, and thus, force of friction with the output shaft 52 can be prevented from increasing.

The following briefly outlines the differential device (1) and the drive transmission device (10) described above.

In one aspect, a differential device (1) includes a differential gear mechanism (2) and a differential case (3). The differential gear mechanism (2) includes a plurality of gears (4, 5) meshing with each other. The differential case (3) includes an accommodation chamber (30) accommodating the differential gear mechanism (2), and rotates around a predetermined reference axis (X). A direction along the reference axis (X) is defined as an axial direction (L), a direction perpendicular to the reference axis (X) is defined as a radial direction (R), a direction circling around the reference axis (X) is defined as a circumferential direction (C), and a side from a center (Y) of the accommodation chamber (30) to an outside of the differential case (3) in the axial direction (L) is defined as an axial outer side (L1). The differential gear mechanism (2) is configured in such a way as to distribute, to a pair of output shafts (52) arranged on the reference axis (X), drive force transmitted to the differential case (3). The differential case (3) includes a pair of output shaft holes (35) through which a pair of the output shafts (52) penetrate. One of a pair of the output shafts (52) is defined as a target shaft (53). One of a pair of the output shaft holes (35) is defined as a target shaft hole (36) through which the target shaft (53) penetrates. An opening of an end portion on the axial outer side (L1) in the target shaft hole (36) is defined as a target opening (37). An oil reception groove (38) is formed at a position that is on an inner circumferential surface (36*a*) of the target shaft hole (36) and that communicates with the target opening (37). The oil reception groove (38) is recessed to an outer side (R1) in the radial direction (R), and extends in the circumferential direction (C). A connection groove (39) extending in the axial direction (L) is formed on at least one of the inner circumferential surface (36*a*) of the target shaft hole (36) and an outer circumferential surface (53*b*) of the target shaft (53) in such a way as to connect the oil reception groove (38) and the accommodation chamber (30) to each other.

According to this configuration, oil existing around the differential case (3) enters the oil reception groove (38) from the target opening (37), and is guided from the oil reception groove (38) into the accommodation chamber (30) through the connection groove (39). Thus, the oil can be guided from an outside of the differential case (3) to an inside of the accommodation chamber (30), and can appropriately lubricate the differential gear mechanism (2). The oil reception groove (38) is formed on the inner circumferential surface (36*a*) of the target shaft hole (36) in such a way as to be recessed to an outer side (R1) in the radial direction (R). For this reason, even in a situation where the differential case (3) and the target shaft (53) rotate and the centrifugal force acts on the oil adhering to the differential case (3) and the target shaft (53), the oil can be received from an outer side (R1) in the radial direction (R) by the oil reception groove (38), and can be appropriately guided into the accommodation chamber (30). Thus, according to this configuration, even when the centrifugal force acts on the lubricating oil to be introduced into the differential case (3), the oil can be appropriately introduced into the differential case (3).

In the differential device (1), an introduction groove (58) may be formed at a position that is on the outer circumferential surface (53*b*) of the target shaft (53) and that overlaps with the target opening (37) in a radial-direction view along the radial direction (R). The introduction groove (58) may be recessed to an inner side (R2) in the radial direction (R), and extends in the circumferential direction (C).

According to this configuration, even in a situation where the differential case (3) and the target shaft (53) are stationary or rotating at a low speed, and thus, oil existing around the differential case (3) flows to a lower side (V2) due to the gravity, the oil can be received by the introduction groove (58) and appropriately guided to the accommodation chamber (30). Thus, according to this configuration, regardless of a rotational speed of the differential case (3) and the target shaft (53), the oil can be guided from an outside of the differential case (3) to an inside of the accommodation chamber (30), and thereby, the differential gear mechanism (2) can be appropriately lubricated.

In the differential device (1), the differential case (3) may not include an opening communicating with an outside of the differential case (3), other than a pair of the output shaft holes (35).

According to this configuration, the oil guided into the accommodation chamber (30) by the oil reception groove (38) and the connection groove (39) can be easily retained in the accommodation chamber (30). Thus, even when a liquid surface of the oil outside the differential case (3) is on a lower side (V2) of a liquid surface of the oil in the accommodation chamber (30), the differential gear mechanism (2) can be appropriately lubricated by the oil retained inside the accommodation chamber (30).

A drive transmission device (10) includes the differential device (1), a housing (9) that supports and accommodates the differential case (3), and a support bearing (93) that supports the differential case (3) in such a way as to be rotatable relative to the housing (9). The differential case (3) includes a tubular boss portion (33) that is arranged on the reference axis (X) and that protrudes in the axial outer side (L1). The target shaft hole (36) is formed in such a way as to penetrate through the boss portion (33). The support bearing (93) is arranged in such a way as to support the boss portion (33) from an outer side (R1) in the radial direction (R). The housing (9) includes a facing portion (94) that is on an outer side (R1) of the target shaft (53) in the radial direction (R), through which the target shaft (53) penetrates, and that faces the support bearing (93) from the axial outer side (L1). The drive transmission device (10) further includes a partition member (6) that is arranged at a position adjacent to the support bearing (93) from the axial outer side (L1) in such a way as to cover a surface on the axial outer side (L1) in the support bearing (93).

According to this configuration, an amount of the oil flowing to a side of the support bearing (93) is restricted by the partition member (6), and thus, the oil that has flowed into a space between the facing portion (94) and the partition member (6) can be stored in the space. The stored oil can be then guided from the target opening (37) into the accommodation chamber (30) through the connection groove (39). Thus, a large amount of oil can be guided from an outside of the differential case (3) to an inside of the accommodation chamber (30), and thereby, the differential gear mechanism (2) can be appropriately lubricated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A differential device comprising:
a differential gear mechanism that includes a plurality of gears meshing with each other; and
a differential case that includes an accommodation chamber accommodating the differential gear mechanism, and rotates around a predetermined reference axis, wherein a direction along the reference axis is defined as an axial direction, a direction perpendicular to the reference axis is defined as a radial direction, a direction circling around the reference axis is defined as a circumferential direction, and a side from a center of the accommodation chamber to an outside of the differential case in the axial direction is defined as an axial outer side, the differential gear mechanism is configured in such a way as to distribute, to a pair of output shafts arranged on the reference axis, drive force transmitted to the differential case, the differential case includes a pair of output shaft holes through which the pair of the output shafts penetrate, one of the pair of the output shafts is defined as a target shaft, and one of the pair of the output shaft holes is defined as a target shaft hole through which the target shaft penetrates, an opening of an end portion on the axial outer side in the target shaft hole is defined as a target opening, an oil reception groove is located at a position communicating with the opening of the end portion of the target shaft hole, is recessed outward in the radial direction and is formed parallel to the circumferential direction over an entire circumference, a connection groove extending in the axial direction is formed parallel to the axial direction and is formed on at least one of the inner circumferential surface of the target shaft hole and an outer circumferential surface of the target shaft in such a way as to connect the oil reception groove and the accommodation chamber to each other, and an introduction groove is formed at a position that is on the outer circumferential surface of the target shaft and that overlaps with the target opening in a radial-direction view along the radial direction, and the introduction groove is recessed to an inner side in the radial direction, and extends in the circumferential direction.

2. A drive transmission device comprising:
the differential device according to claim 1;
a housing that supports and accommodates the differential case; and
a support bearing that supports the differential case in such a way as to be rotatable relative to the housing, wherein
the differential case includes a tubular boss portion that is arranged on the reference axis and that protrudes in the axial outer side,
the target shaft hole is formed in such a way as to penetrate through the boss portion,
the support bearing is arranged in such a way as to support the boss portion from an outer side in the radial direction,
the housing includes a facing portion that is on an outer side of the target shaft in the radial direction, through which the target shaft penetrates, and that faces the support bearing from the axial outer side, and
the drive transmission device further comprises a partition member that is arranged at a position adjacent to the support bearing from the axial outer side in such a way as to cover a surface on the axial outer side in the support bearing.

3. A differential device comprising:
a differential gear mechanism that includes a plurality of gears meshing with each other; and a differential case that includes an accommodation chamber accommodating the differential gear mechanism, and rotates around a predetermined reference axis, wherein a direction along the reference axis is defined as an axial direction, a direction perpendicular to the reference axis is defined as a radial direction, a direction circling around the reference axis is defined as a circumferential direction, and a side from a center of the accommodation chamber to an outside of the differential case in the axial direction is defined as an axial outer side, the differential gear mechanism is configured in such a way as to distribute, to a pair of output shafts arranged on the reference axis, drive force transmitted to the differential case, the differential case includes a pair of output shaft holes through which the pair of the output shafts penetrate, one of the pair of the output shafts is defined as a target shaft, and one of the pair of the output shaft holes is defined as a target shaft hole through which the target shaft penetrates, an opening of an end portion on the axial outer side in the target shaft hole is defined as a target opening, an oil reception groove is located at a position communicating with the opening of the end portion of the target shaft hole, is recessed outward in the radial direction and is formed parallel to the circumferential direction over an entire circumference, a connection groove extending in the axial direction is formed parallel to the axial direction and is formed on at least one of the inner circumferential surface of the target shaft hole and an outer circumferential surface of the target shaft in such a way as to connect the oil reception groove and the accommodation chamber to each other, and the differential case does not include an opening communicating with an outside of the differential case, other than the pair of the output shaft holes.

4. A drive transmission device comprising:

the differential device according to claim 3;

a housing that supports and accommodates the differential case; and a support bearing that supports the differential case in such a way as to be rotatable relative to the housing, wherein the differential case includes a tubular boss portion that is arranged on the reference axis and that protrudes in the axial outer side, the target shaft hole is formed in such a way as to penetrate through the boss portion, the support bearing is arranged in such a way as to support the boss portion from an outer side in the radial direction, the housing includes a facing portion that is on an outer side of the target shaft in the radial direction, through which the target shaft penetrates, and that faces the support bearing from the axial outer side, and the drive transmission device further comprises a partition member that is arranged at a position adjacent to the support bearing from the axial outer side in such a way as to cover a surface on the axial outer side in the support bearing.

5. A drive transmission device comprising:

a differential device comprising:

a differential gear mechanism that includes a plurality of gears meshing with each other; and a differential case that includes an accommodation chamber accommodating the differential gear mechanism, and rotates around a predetermined reference axis, wherein a direction along the reference axis is defined as an axial direction, a direction perpendicular to the reference axis is defined as a radial direction, a direction circling around the reference axis is defined as a circumferential direction, and a side from a center of the accommodation chamber to an outside of the differential case in the axial direction is defined as an axial outer side, the differential gear mechanism is configured in such a way as to distribute, to a pair of output shafts arranged on the reference axis, drive force transmitted to the differential case, the differential case includes a pair of output shaft holes through which the pair of the output shafts penetrate, one of the pair of the output shafts is defined as a target shaft, and one of the pair of the output shaft holes is defined as a target shaft hole through which the target shaft penetrates, an opening of an end portion on the axial outer side in the target shaft hole is defined as a target opening, an oil reception groove is located at a position communicating with the opening of the end portion of the target shaft hole, is recessed outward in the radial direction and is formed parallel to the circumferential direction over an entire circumference, and a connection groove extending in the axial direction is formed parallel to the axial direction and is formed on at least one of the inner circumferential surface of the target shaft hole and an outer circumferential surface of the target shaft in such a way as to connect the oil reception groove and the accommodation chamber to each other a housing that supports and accommodates the differential case; and a support bearing that supports the differential case in such a way as to be rotatable relative to the housing, wherein the differential case includes a tubular boss portion that is arranged on the reference axis and that protrudes in the axial outer side, the target shaft hole is formed in such a way as to penetrate through the boss portion, the support bearing is arranged in such a way as to support the boss portion from an outer side in the radial direction, the housing includes a facing portion that is on an outer side of the target shaft in the radial direction, through which the target shaft penetrates, and that faces the support bearing from the axial outer side, and the drive transmission device further comprises a partition member that is arranged at a position adjacent to the support bearing from the axial outer side in such a way as to cover a surface on the axial outer side in the support bearing.

* * * * *